United States Patent
Groom et al.

(10) Patent No.: US 7,967,042 B2
(45) Date of Patent: Jun. 28, 2011

(54) FUEL-DISPENSING NOZZLE INHIBITOR

(75) Inventors: J Bradley Groom, Oxford, OH (US); Lowell R Bell, Fountaintown, IN (US)

(73) Assignee: Stant USA Corp., Connerville, IN (US)

( * ) Notice: Subject to any disclaimer, the term of this patent is extended or adjusted under 35 U.S.C. 154(b) by 5 days.

(21) Appl. No.: 12/546,512

(22) Filed: Aug. 24, 2009
(Under 37 CFR 1.47)

(65) Prior Publication Data

US 2010/0175785 A1     Jul. 15, 2010

Related U.S. Application Data

(63) Continuation of application No. 12/366,578, filed on Feb. 5, 2009, now abandoned.

(60) Provisional application No. 61/030,466, filed on Feb. 21, 2008.

(51) Int. Cl.
*B65B 1/04* (2006.01)

(52) U.S. Cl. ............... 141/367; 141/350; 251/149.1

(58) Field of Classification Search ........... 141/346, 141/286, 348–350, 367, 363; 251/149.1, 251/149.2
See application file for complete search history.

(56) References Cited

U.S. PATENT DOCUMENTS

| | | | |
|---|---|---|---|
| 3,730,216 A * | 5/1973 | Arnett et al. ............ | 137/588 |
| 5,145,081 A | 9/1992 | Gravino | |
| 6,302,169 B1 * | 10/2001 | Pulos ................. | 141/301 |
| 6,382,270 B1 * | 5/2002 | Gzik ................... | 141/94 |
| 7,077,178 B2 | 7/2006 | Hedevang | |
| 7,182,111 B2 | 2/2007 | McClung et al. | |
| 7,293,586 B2 * | 11/2007 | Groom et al. ......... | 141/350 |
| 7,302,977 B2 | 12/2007 | King et al. | |
| 2007/0251598 A1 | 11/2007 | Nakazawa et al. | |

FOREIGN PATENT DOCUMENTS

| | | | |
|---|---|---|---|
| DE | 1712398 | * | 1/2004 |
| EP | 1555154 | | 7/2005 |
| EP | 1974976 | | 10/2008 |
| FR | 2917341 | | 12/2008 |
| WO | 2009012197 | | 1/2009 |

OTHER PUBLICATIONS

European Search Report dated Jun. 26, 2009, for Application EP09002344.

* cited by examiner

*Primary Examiner* — Gregory L Huson
*Assistant Examiner* — Jason K Niesz
(74) *Attorney, Agent, or Firm* — Barnes & Thornburg LLP

(57) ABSTRACT

A nozzle inhibitor is included in a fuel tank filler neck closure assembly. The nozzle inhibitor blocks full insertion of a small-diameter unleaded fuel nozzle into the filler neck closure assembly yet allows full insertion of a large-diameter diesel fuel nozzle into the filler neck closure assembly.

21 Claims, 10 Drawing Sheets

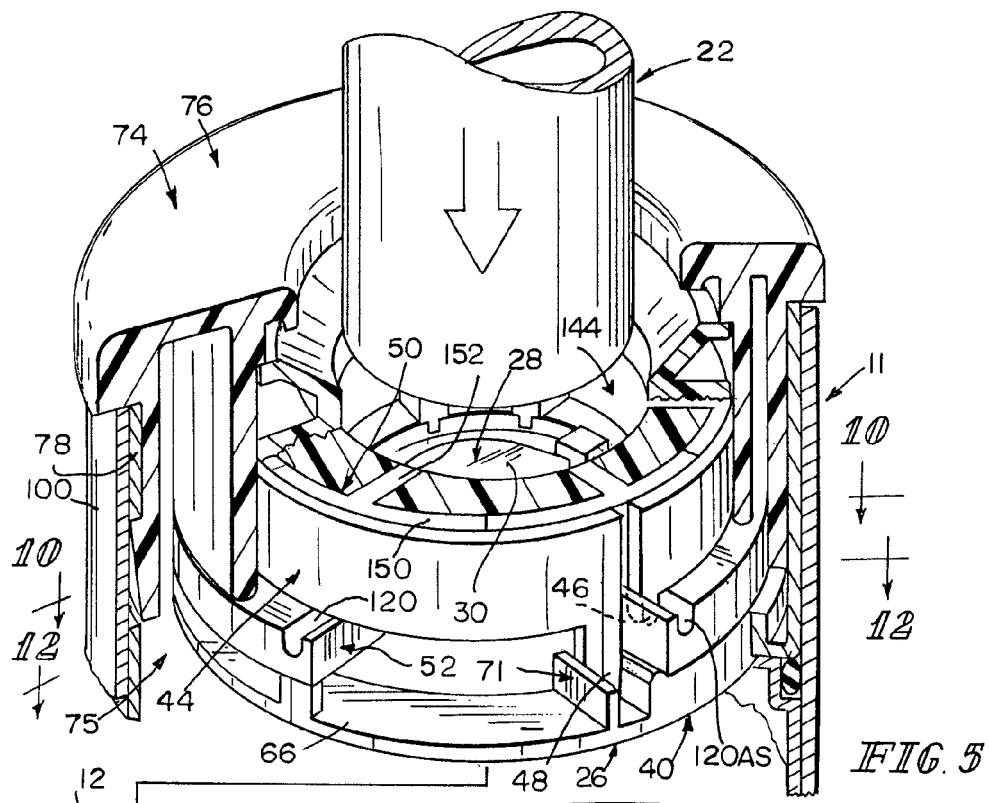
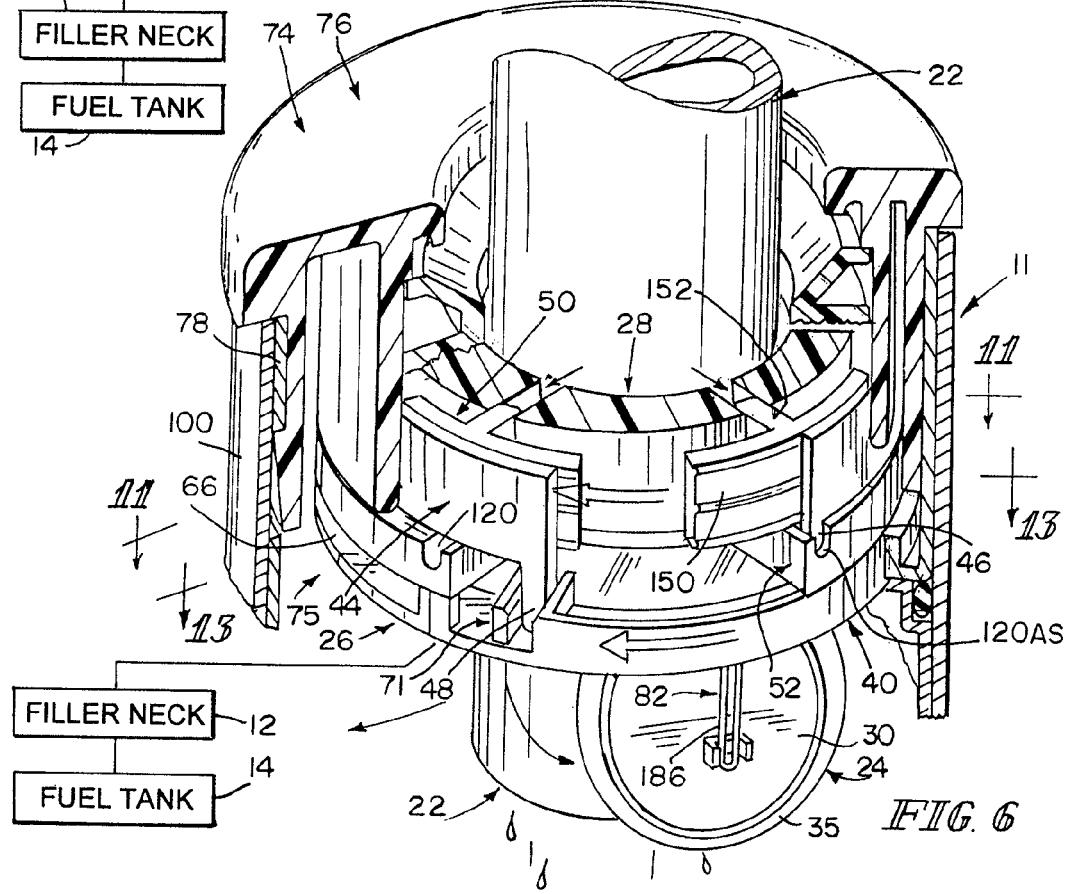

FUEL-DISPENSING NOZZLE INHIBITOR

This application is a continuation of U.S. application Ser. No. 12/366,578, filed Feb. 5, 2009, which claims priority to U.S. Provisional Application Ser. No. 61/030,466, filed Feb. 21, 2008, both of which are expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a motor vehicle powered by a diesel engine. It is customary to use a small-diameter fuel-dispensing nozzle (e.g., 21.5 mm or less) to dispense unleaded fuel into a fuel tank fill tube and to use a large-diameter fuel-dispensing nozzle (e.g., 23.5 mm or more) to dispense diesel and leaded fuel into a fuel tank fill tube.

SUMMARY

A nozzle inhibitor is configured to be coupled to a fuel tank fill tube and arranged to allow only a diesel fuel nozzle having an outer diameter that is greater than a specified minimum diameter to be inserted into the fill tube to a depth sufficient so that a user may dispense diesel fuel from that nozzle into a diesel fuel tank coupled to the fill tube. Such a nozzle inhibitor inhibits insertion of a small-diameter unleaded fuel nozzle into the fill tube of a diesel fuel tank, yet allows a large-diameter diesel fuel nozzle to be inserted into the fill tube of the diesel fuel tank.

In illustrative embodiments, the fill tube includes a filler neck coupled to the diesel fuel tank and a filler neck closure assembly coupled to the filler neck. The nozzle inhibitor is included in the filler neck closure assembly.

The nozzle inhibitor illustratively includes a fill-tube closure comprising a flapper door mounted for movement between a closed position blocking entry of a fuel-dispensing nozzle into the filler neck and an opened position allowing entry of a nozzle into the filler neck. The nozzle inhibitor further includes a flapper door lock comprising a rotatable lock ring, a variable-circumference band, and a pair of downwardly extending tabs coupled to opposite ends of the band. One of the tabs is a stationary band anchor. The other of the tabs is a movable ring rotator arranged to mate with and rotate the rotatable lock ring during expansion of the circumference of the variable-circumference band. The nozzle inhibitor also includes a door lock opener located inside the variable-circumference band. The rotatable lock ring includes a pair of separate door-motion blockers that mate normally with door-position retainers included in the flapper door to retain the flapper door in a closed position.

Only a large-diameter (diesel) fuel-dispensing nozzle can actuate the door lock opener in accordance with the present disclosure to expand the circumference of the variable-circumference band and cause rotation of the lock ring to cause the door-motion blockers included in the flapper door lock to separate from the door-position retainers included in the flapper door. Separation of the door-motion blockers and the door-position retainers frees the flapper door to be moved from the closed position to the opened position and thus allows passage of the fuel-dispensing nozzle past an opened flapper door into a filler neck coupled to the fuel tank.

A relatively smaller small-diameter (unleaded) fuel-dispensing nozzle, in contrast, is not wide enough at the tip to spread apart all of the arc-shaped band movers included in the door lock opener to expand the circumference of the variable-circumference band in the flapper door lock and cause the door-motion blockers to disengage (i.e., separate) from the door-position retainers included in the flapper door. As such, the door-motion blockers continue to engage (i.e., confront) the door-position retainers to retain the flapper door in a closed position blocking passage of the small-diameter nozzle through the filler neck closure assembly and admission of the small-diameter nozzle into the fuel tank filler neck.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 5 is a perspective view of a nozzle inhibitor comprised of the components shown in FIG. 4 and a tip of a large-diameter (diesel) fuel-dispensing nozzle above the nozzle inhibitor, with portions of the fill tube, outer shell, and inner shell removed to show the variable-circumference band surrounding the arc-shaped band movers, a relatively shorter band anchor (tab) coupled to one end of the band (on the right) and arranged to extend downwardly into a radially extending guide slot (anchor socket) formed in the band-motion guide housing and a relatively long ring rotator (tab) coupled to an opposite end of the band (on the left) and arranged to extend downwardly into a rotator socket formed in the lock ring;

FIG. 6 is a perspective view similar to FIG. 5 after downward movement of the tip of the large-diameter (diesel) fuel-dispensing nozzle into a central opening formed in the nozzle inhibitor to contact sloped ramps on the six arc-shaped band movers and urge the band movers to slide in radially outward directions to expand the circumference of the variable-circumference band and cause the ring rotator to move (to the left) in a direction away from the stationary band anchor so as to rotate the lock ring in a clockwise direction (relative to the stationary band-motion guide housing coupled to the band anchor) to disengage and separate from the flapper door (as suggested in FIGS. 7-9 and 12-13) to free the flapper door to be pivoted to assume an opened position by further downward movement of the tip of the large-diameter (diesel) fuel-dispensing nozzle;

FIG. 7 is a perspective view showing the ring rotator extending downwardly from one end of the variable-circumference band into a rotator socket formed in the lock ring while the lock ring lies in a flapper door-locking position relative to the flapper door, a radially inwardly extending first door-motion blocker (shown in phantom) included in the lock ring and arranged to lie under a horizontal retention flange included in the L-shaped upstanding first door-position retainer included in the flapper door, a radially inwardly extending second door-motion blocker (shown in solid) included in the lock ring and arranged to lie under a horizontal retention flange included in the L-shaped upstanding second door-position retainer included in the flapper door;

FIG. 8 is a perspective view similar to FIG. 7 showing clockwise rotation of the lock ring about the vertical central axis relative to the underlying pivotable flapper door in response to a rotation-inducing torque applied by the ring rotator during expansion of the circumference of the variable-circumference band to begin to move the first door-motion blocker along a curved path away from the first door-position retainer and to move the second door-motion blocker along a curved path away from the second door-position retainer;

FIG. 9 is a perspective view similar to FIGS. 7 and 8 showing further clockwise rotation of the lock ring about the vertical central axis in response to further expansion of the circumference of the variable-circumference band to separate the first door-motion blocker in the lock ring from the first door-position retainer in the flapper door and to separate the second door-motion blocker in the lock ring from the second door-position retainer in the flapper door so that the lock ring is moved to assume the flapper door-unlocking position freeing the flapper door to pivot from a closed position (shown in solid in FIGS. 7-9) to an opened position (shown in phantom in FIG. 9);

DETAILED DESCRIPTION

Figure 1:
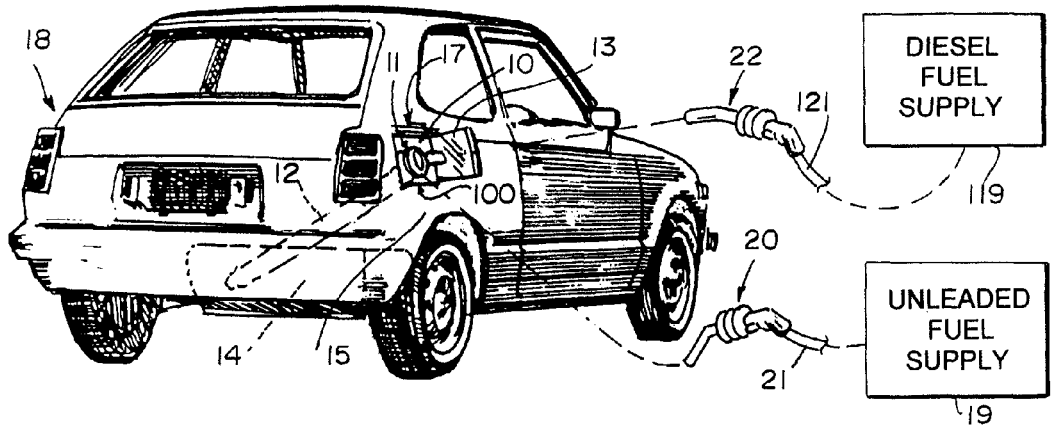
FIG. 1 is a perspective view of a diesel-engine vehicle provided with a capless fuel tank fill tube showing an outer filler neck access door moved to an opened position relative to a vehicle body panel to expose an illustrative capless filler neck closure assembly coupled to a filler neck (shown in phantom) leading to a vehicle fuel tank (also shown in phantom), showing a large-diameter (diesel) fuel-dispensing nozzle coupled to a diesel fuel supply and configured to be inserted into the filler neck closure assembly during vehicle refueling to discharge liquid diesel fuel into the filler neck leading to the vehicle fuel tank, and showing a small-diameter (unleaded) fuel-dispensing pump nozzle that is not authorized for use to refuel the diesel-engine vehicle fuel tank.

A nozzle inhibitor 10 is adapted to be mounted in a capless fill tube 100 as shown, for example, in FIGS. 1-2, 5-6, and 14-15 to block use of a small-diameter (unleaded) fuel-dispensing nozzle 20 to dispense non-diesel unleaded fuel into a fuel tank 14 of a diesel-engine vehicle 18. Nozzle inhibitor 10 is configured to allow a user to dispense diesel fuel into such a tank using a large-diameter (diesel) fuel-dispensing nozzle 22 as shown, for example, in FIGS. 2, 3, 11, 13, and 14-15. Nozzle inhibitor 10 is also suitable for use in a traditional fill pipe closed by a fuel (gas) cap.

Figure 2:
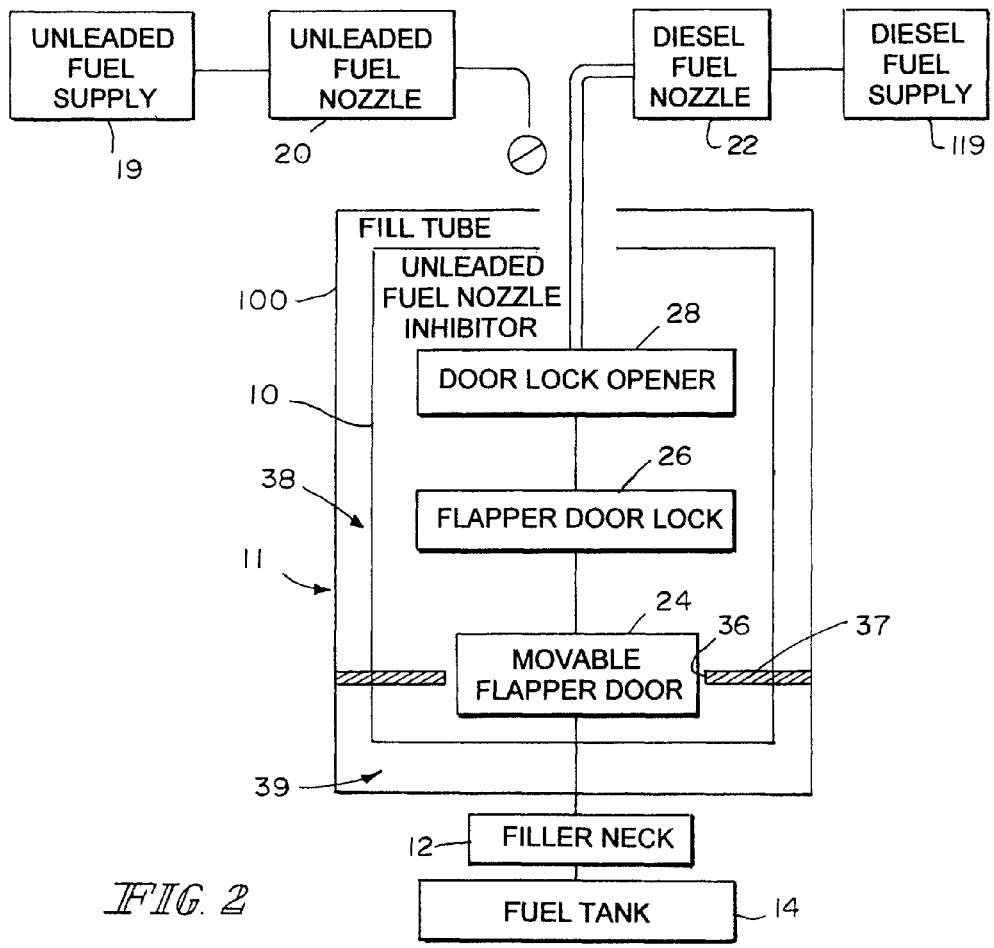
FIG. 2 is a diagrammatic view of a filler neck closure assembly in accordance with the present disclosure showing that an unleaded fuel nozzle inhibitor is located in a fuel tank fill tube and formed to include a movable flapper door, a flapper door lock, and a door lock opener and suggesting that the unleaded fuel nozzle inhibitor is configured to provide inhibitor means for preventing insertion of a small-diameter unleaded fuel-dispensing pump nozzle into a fuel-conducting passageway formed in a filler neck included in the fuel tank fill tube and coupled to a vehicle fuel tank while allowing insertion of a large-diameter diesel fuel-dispensing pump nozzle into the fuel-conducting passageway formed in the filler neck.

As suggested in FIG. 2, nozzle inhibitor 10 is associated with a capless fill tube 100 coupled to a vehicle fuel tank 14 to prevent a fuel-purchasing customer from using an unleaded fuel-dispensing nozzle 20 to discharge unleaded fuel into a vehicle 18 having a diesel engine (not shown) requiring only diesel fuel. Nozzle inhibitor 10 includes a movable flapper door 24, a flapper door lock 26, and a door lock opener 28 as shown diagrammatically in FIGS. 2 and 3 and illustratively in FIGS. 4, 5, 6, 14, and 15.

Figure 3:
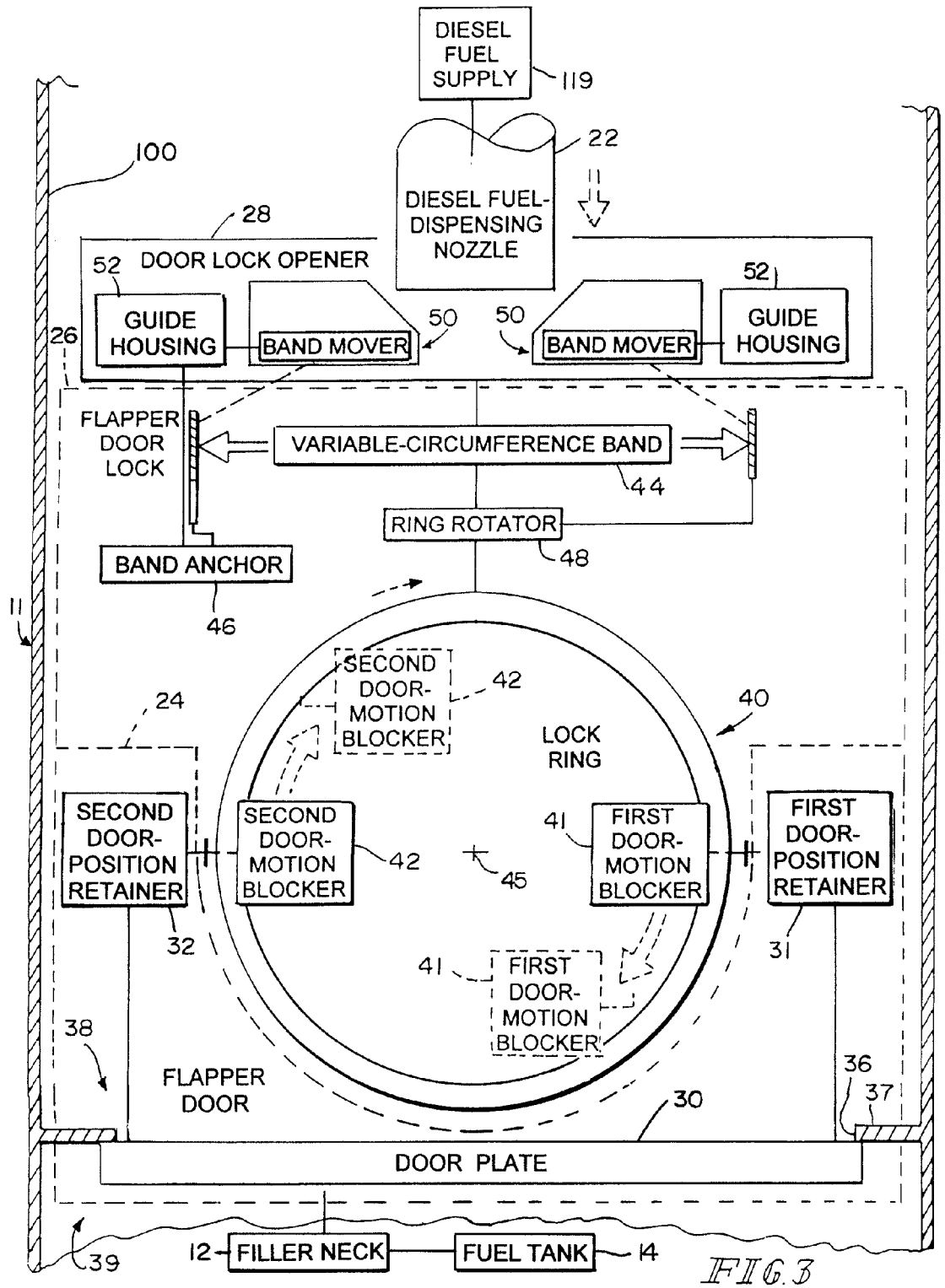
FIG. 3 is a diagrammatic view of a filter neck closure assembly in accordance with the present disclosure mounted in a fuel tank fill tube and configured to include a flapper door, a flapper door lock, and a door lock opener and showing that the flapper door includes a movable door plate and two door-position retainers, the flapper door lock includes a variable-circumference band, a rotatable lock ring having two door-motion blockers configured to confront and mate with the door-position retainers to retain the movable door plate normally in a closed position, and a ring rotator coupled to the variable-circumference and to the lock ring to provide means for rotating the lock ring in response to expansion of the circumference of the variable-circumference band, and the door lock opener includes band movers mounted for movement on a guide housing to expand the circumference of the variable-circumference band in response to forces applied by a moving large-diameter (diesel) fuel-dispensing pump nozzle in the fuel tank fill tube.

In an illustrative embodiment, fill tube 100 includes a filler neck closure assembly 11 coupled to a filler neck 12 that is coupled to a fuel tank 14 as shown diagrammatically in FIGS. 2 and 3. Nozzle inhibitor 10 is configured to block full insertion of a small-diameter (unleaded) fuel-dispensing nozzle 20 into filler neck 12 as suggested in FIGS. 2 and 16. However, nozzle inhibitor 10 is configured to allow fuel insertion of a relatively large-diameter (diesel) fuel-dispensing nozzle 22 into filler neck 12 as suggested in FIGS. 2, 6, 11, 13, and 15.

As shown in FIG. 1, a filler neck closure assembly 11 containing nozzle inhibitor 10 is provided in a vehicle 18 normally to close a filler neck 12 extending from fuel tank 14 onboard vehicle 18. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that filler neck closure assembly 11 is out of sight when access door 13 is closed.

Small-diameter nozzle 20 is coupled to an unleaded fuel supply 19 by a hose 21. Large-diameter nozzle 22 is coupled to a diesel fuel supply 119 by another hose 121. In many cases, both nozzles 20, 22 will be available at a filling station. Nozzle inhibitor 10 in filler neck closure assembly 11 in vehicle 18 functions to block a consumer from inadvertently using small-diameter nozzle 20 to discharge unleaded fuel into a fuel tank filler neck of a vehicle that uses only diesel fuel.

Figure 4:
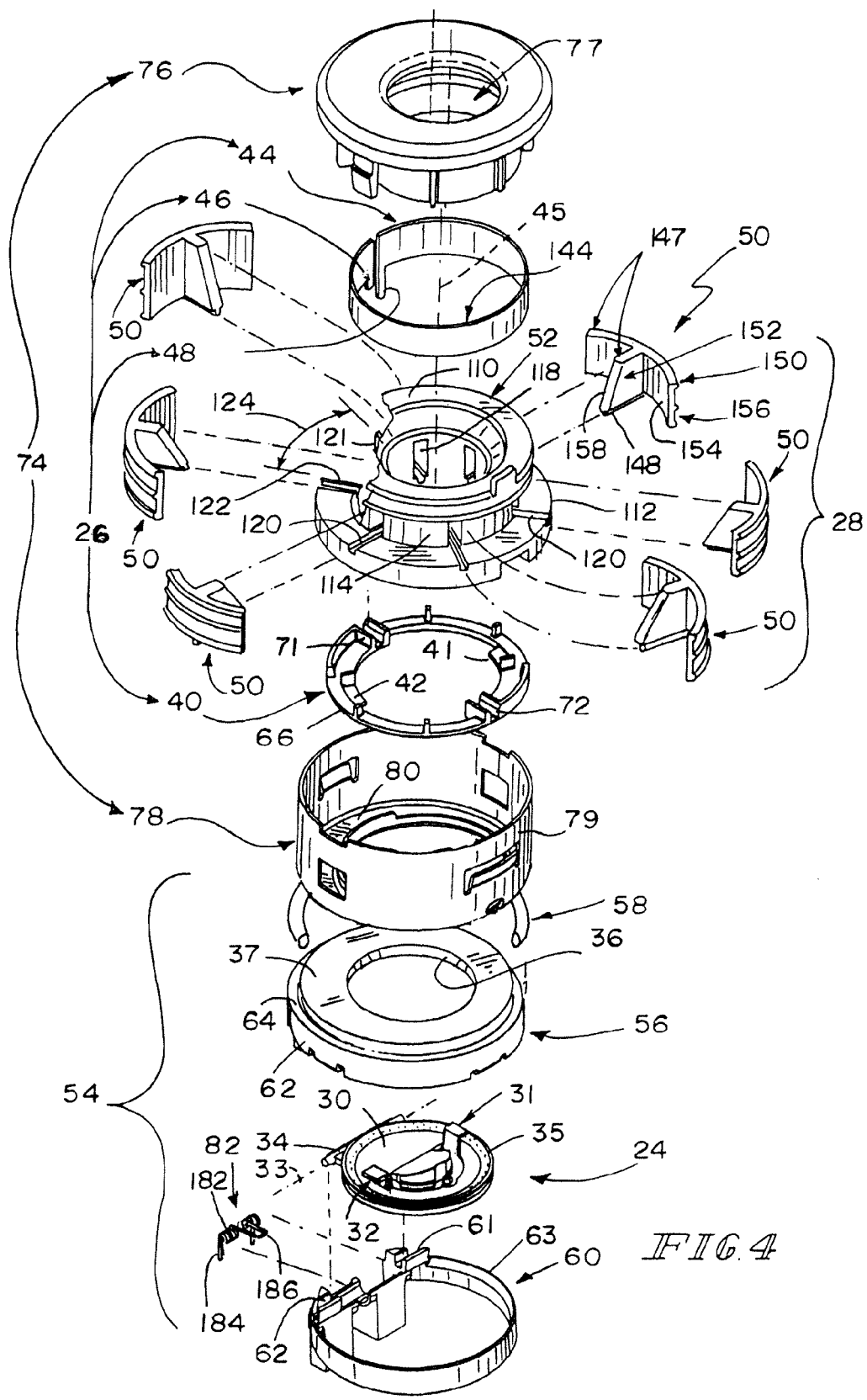
FIG. 4 is an exploded perspective assembly view of components included in an illustrative embodiment of the filler neck closure assembly of FIG. 2 showing (in sequence from top to bottom) an outer shell formed to include a nozzle-receiving mouth, a variable-circumference band carrying a short band anchor at one end and a relatively longer ring rotator at an opposite end, a multi-part door lock opener including six separate arc-shaped band movers, and a band-mover guide housing surrounded by the arc-shaped band movers, a lock ring cooperating with the variable-circumference band, the band anchor, and the ring rotator to form a flapper door lock, a cylindrical inner shell cooperating with the outer shell to form an inhibitor housing sized to contain the flapper door lock and the multi-part door lock opener therein (as suggested in FIGS. 5 and 6), and a fill-tube closure including an O-ring seal, an annular base configured to mate with the O-ring seal and to include a nozzle-receiving aperture, a pivotable flapper door including two L-shaped upstanding door-position retainers configured to mate with the lock ring (as suggested in FIGS. 7, 12, and 14) to retain the flapper door in a closed position, a horseshoe-shaped door mount, and a flapper door return spring.

Movable flapper door 24, as suggested diagrammatically in FIG. 3 and illustratively in FIG. 4 includes a movable door plate 30, first and second door-position retainers 31, 32 coupled to door plate 30, and a pivot mount 34 coupled to door plate 30. Door plate 30 is arranged normally to close an aperture 36 providing a passageway interconnecting a nozzle-receiving chamber 38 formed in filler neck closure assembly 11 and a nozzle-receiving chamber 39 formed in filter neck 12. Pivot mount 34 is arranged to support door plate 30 for pivotable movement about pivot axis 33 between a closed position shown in FIGS. 3, 5, 7, 8, 10, and 12-15 and an opened position shown in FIGS. 6 and 9 (phantom lines). A seal ring 35 is coupled to an upwardly facing surface on door plate 30 and arranged normally to mate with a wall 37 formed to include aperture 36 to block flow of liquid fuel and fuel vapor from chamber 39 to chamber 38 when door plate 30 is moved to assume the closed position as suggested in FIG. 14.

Flapper door lock 26, as suggested diagrammatically in FIG. 3 and illustratively in FIG. 4, includes a rotatable lock ring 40 including first and second door-motion blockers 41, 42, a variable-circumference band 44, a stationary band anchor 46 coupled to variable-circumference band 44 and to door lock opener 28, and a movable ring rotator 48 coupled to variable-circumference band 44 and to lock ring 40. First and second door-motion blockers 41, 42 are configured to mate with companion first and second door-position retainers 31, 32 included in flapper door 24 to retain movable door plate 30 in the closed position as suggested in FIGS. 7, 10, 12, and 14. Whenever the circumference of variable-circumference band 44 expands (in response to downward movement of a large-diameter (diesel) fuel-dispensing nozzle 22 into filler neck closure assembly 11 and nozzle inhibitor 10), ring rotator 48 will move relative to stationary band anchor 46 to cause lock ring 44 to rotate about a vertical axis 45 to separate first and second door-motion blockers 41, 42 in lock ring 40 from companion door-position retainers 31, 32 in flapper door 24 to free door plate 30 to be pivoted about pivot axis 33 to assume an opened position as suggested, for example in FIGS. 7-9 and 12-13.

Door lock opener 28, as suggested diagrammatically in FIG. 3 and illustratively in FIG. 4, includes several band movers 50 and a band-mover guide housing 52. Band movers 50 are arranged to lie about vertical axis 45 and to be surrounded by variable-circumference band 44. Band-mover guide housing 52 is configured to support band movers 50 for radial movement relative toward and away from vertical axis 45 to influence the circumference of variable-circumference band 44 and thereby control rotary motion of lock ring 40 about vertical axis 45 between a flapper door-locking position shown in FIGS. 3, 5, 7, 10, 12, and 14 and a flapper door-unlocking position shown in FIGS. 3 (see phantom position of first and second door-motion blockers 41, 42 of lock ring 40), 6, 9, 11, 13, and 15.

Figure 14:
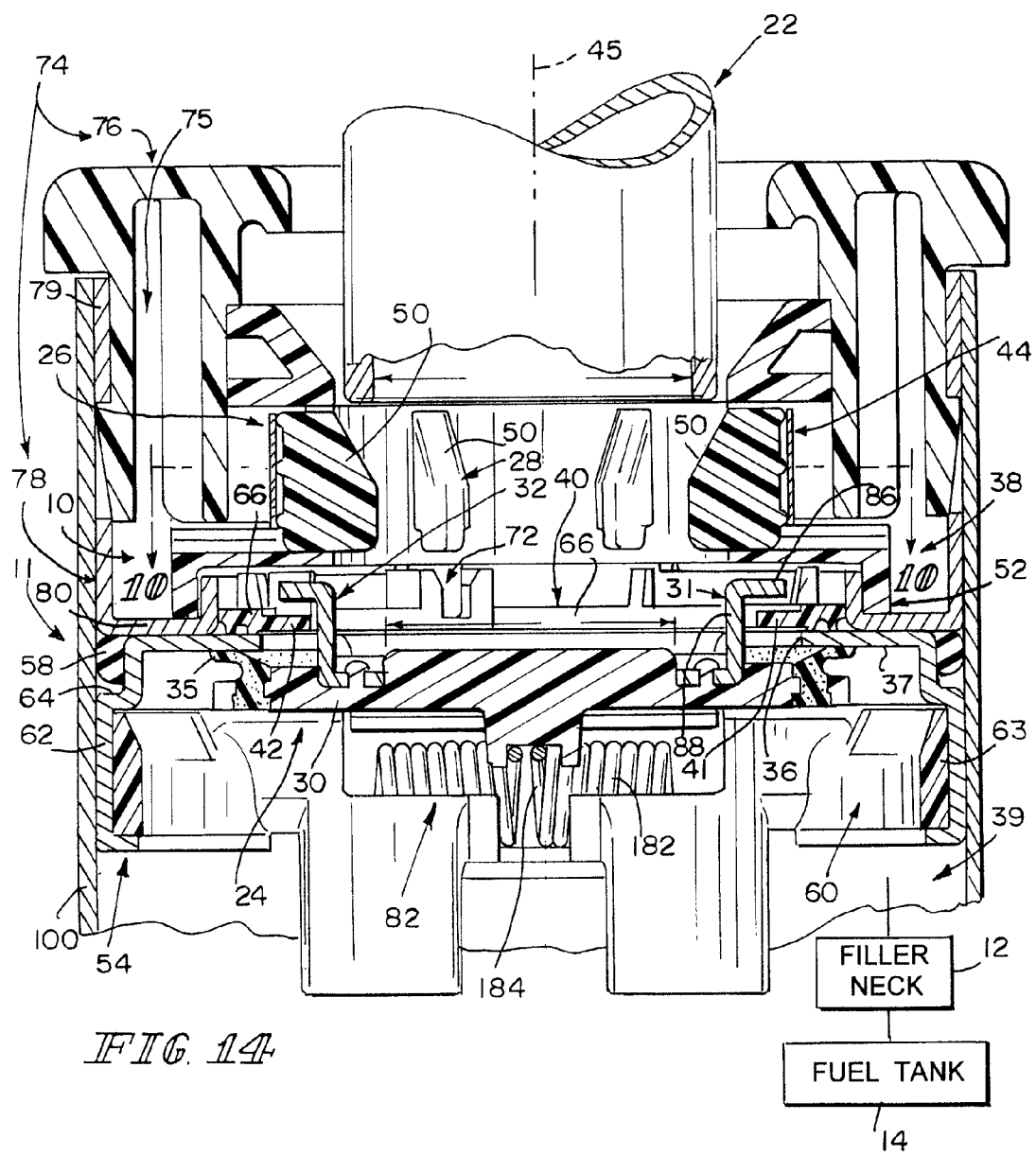
FIG. 14 is a vertical sectional view of the filler neck closure assembly of FIG. 5.

The environment of illustrative flapper door 24 is shown in more detail in FIGS. 4 and 14. In an illustrative embodiment, filler neck closure assembly 11 includes a fill-tube closure 54 mounted in fill tube 100 to form nozzle-receiving chamber 39 in filler neck 12 a suggested in FIG. 14. A fuel-dispensing nozzle can be moved downwardly in fill tube 100 to enter nozzle-receiving chamber 39 in filler neck 12 only after door plate 30 of flapper door 24 has been released from locking engagement with flapper door lock 26 and then moved from the closed position shown in FIG. 14 to the opened position shown in FIG. 6.

Fill-tube closure 54 includes a base 56 formed to include wall 37 providing aperture 36, an O-ring seal 58, flapper door 24, door mount 60, and flapper door return spring 82 as shown, for example, in FIGS. 4 and 14. Flapper door 24 is mounted to base 56 for movement about pivot axis 33 between a closed position closing aperture 36 formed in top wall 37 of base 56 and an opened position opening aperture 36 to allow movement of a fuel-dispensing nozzle therethrough.

Base 56 of fill-tube closure 54 includes a top wall 37 formed to include a nozzle-receiving aperture 36 and a side wall 62 depending from top wall 37. Side wall 62 is arranged to mate with an interior surface of fill tube 100 and configured to include an exterior annular seal-receiving channel 64 as suggested in FIG. 14. O-ring seal 58 is located in seal-receiving channel 64 and arranged to mate with side wall 62 of base 56 and fill tube 100 to establish a liquid fuel and fuel vapor seal therebetween.

Door mount 60 of fill-tube closure 54 includes a curved strip 63, a first pivot support 61 coupled to one end of strip 63, and a second pivot support 62 coupled to another end of strip 63 as suggested in FIG. 4. Pivot mount 34 of flapper door 24 is coupled to first and second pivot supports 61, 62 to support door plate 30 for pivotable movement about pivot axis 33 between the closed and opened positions. Door mount 60 is somewhat horseshoe-shaped in the illustrated embodiment.

Lock ring 40 of flapper door lock 26 includes an annular frame 66 as suggested in FIGS. 4, 7-9, 12, and 13 in an illustrative embodiment of the present disclosure. Each of first and second door-motion blockers 41, 42 is a thin plate cantilevered to an interior edge 68 of annular frame 66 and arranged to extend radially inwardly toward rotation axis 45 and toward one another. Lock ring 40 also includes first and second rotator sockets 71, 72 coupled to annular frame 66 as suggested in FIG. 4. In an illustrative embodiment, ring rotator 48 of flapper door lock 26 will be arranged to extend into and mate with one of rotator sockets 71, 72 (e.g., socket 71) to link variable-circumference band 44 to lock ring 40 so that motion of moving ring rotator 48 relative to stationary band anchor 46 (also coupled to variable-circumference band 44 causes lock ring 40 to rotate about rotation axis 45 to move first and second door-motion blockers 41, 42 relative to companion first and second door-position retainers 31, 32 included in flapper door 24.

As suggested in FIGS. 4 and 14, filler neck closure assembly 11 further includes an inhibitor housing 74 formed to include an interior region 75 containing flapper door lock 26 and door lock opener 28. Inhibitor housing 74 includes an outer shell 76 formed to include a nozzle-receiving mouth 77 and an inner shell 78 coupled to outer shell 76 and arranged to lie between outer shell 76 and base 56 as suggested, for example, in FIGS. 4 and 14. Outer and inner shells 74, 76 cooperate to form interior region 75. Inner shell 78 includes a cylinder-shaped sleeve 79 arranged to mate with outer shell 76 and an annular foundation 80 arranged to surround annular frame 66 of rotatable lock ring 40 to locate annular frame 66 in a rotatable position on top wall 37 of base 56 as suggested in FIG. 14.

Figure 7:
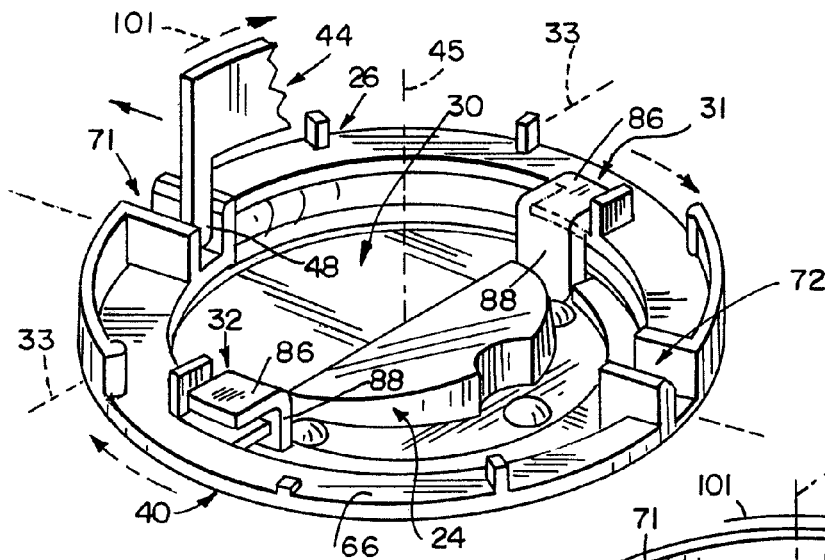
FIGS. 7-9 comprise a series of enlarged perspective views of the lock ring rotating about a vertical central axis relative to the underlying pivotable flapper door from a flapper door-locking position shown in FIG. 7 to a flapper door-unlocking position shown in FIG. 9 in response to a rotation-inducing torque applied by the ring rotator during expansion of circumference of the variable-circumference band as suggested in FIGS. 5 and 6.
Figure 8:
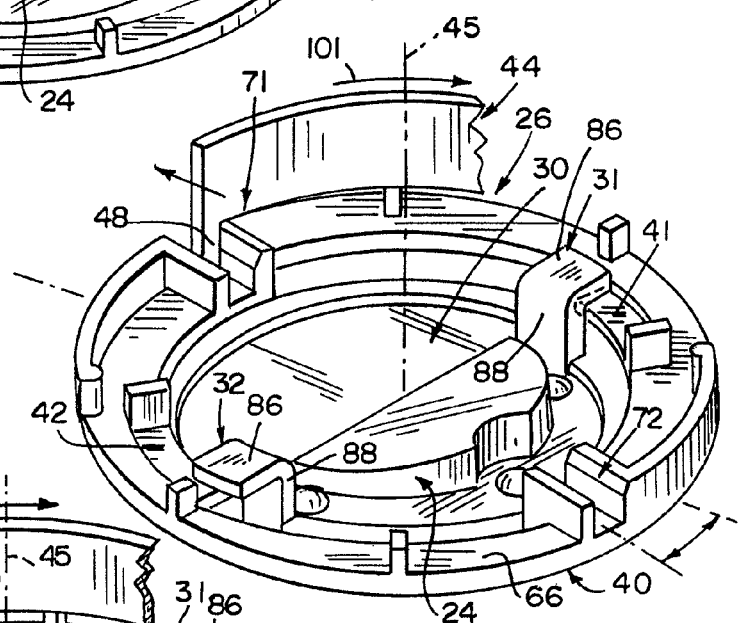
Figure 9:
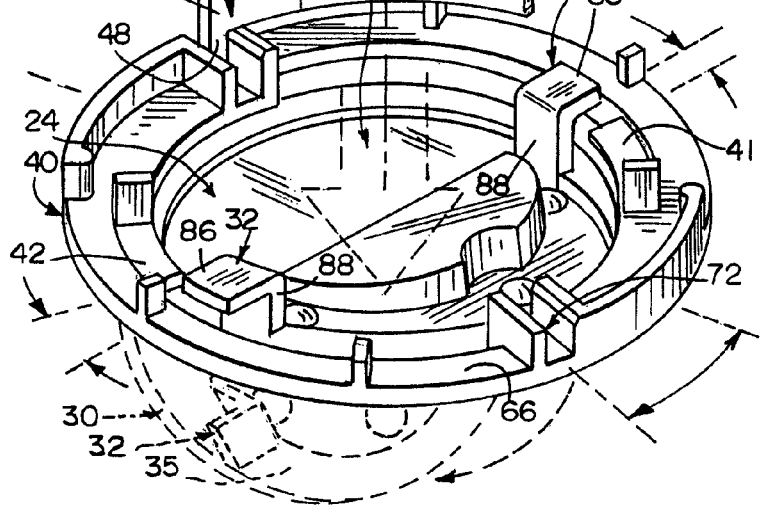

First and second door-position retainers 31, 32 included in flapper door 24 are mounted on door plate 30 to move therewith and arranged to confront and associate with companion first and second door-motion blockers 41, 42 as suggested diagrammatically in FIG. 3 and illustratively in FIGS. 7-9. Each of door-position retainers 31, 32 includes a horizontally extending retention flange 86 coupled to a free end of a vertically extending flange-support leg 88 coupled to an upwardly facing surface of door plate 30. Retention flange 86 of first door-position retainer 31 is arranged to confront and overlie first door-motion blocker 41 and retention flange 86 of second door-position retainer 32 is arranged to confront and overlie second door-motion blocker 42 when lock ring 40 is rotated to assume its flapper door-locking position as shown in FIG. 7. When lock ring 40 rotates about axis 45 to assume its flapper door-unlocking position (in response to a rotation-inducing torque applied by ring rotator 48 coupled to variable-circumference band 44), first and second door-motion blockers 41, 42 are moved to separate from companion first and second door-position retainers 31, 32 as suggested in FIGS. 8 and 9, thereby freeing flapper door 24 to pivot downwardly about pivot axis 33 to assume an opened position shown in phantom in FIG. 9 and in solid shown in FIG. 6. In illustrative embodiments, each of retainers 31, 32 is L-shaped and is arranged to lie in an upstanding orientation on door plate 30.

An illustrative guide housing 52 is shown in FIG. 4 and includes an annular top wall 110, an outer rim 112, and an inner rim 114 arranged to interconnect outer rim 112 and annular top wall 110. Guide housing 52 is configured to include guide means for supporting components included in door lock opener 28 for movement relative to guide housing 52 to operate flapper door lock 26 and cause flapper door 24 to be released and thus free to be moved from a closed position to an opened position. In an illustrative embodiment, inner rim 114 is formed to include six circumferentially spaced-apart head-receiving guide apertures 118 and has an internal diameter that is less than the internal diameter of outer rim 112. Outer rim 112 is formed to include six circumferentially spaced-apart lower guide slots 120 and each lower guide slot 120 is associated with only one of the head-receiving guide apertures 118 as suggested in FIGS. 4, 10, and 11. In the illustrated embodiment, outer rim 112 subtends an angle of about 330° and first and second ends 121, 122 of outer rim 112 are arranged to lie in spaced-apart relation to one another to define a ring rotator-motion area 124 therebetween as suggested in FIGS. 4, 10, and 11. Annular top wall 110 can be formed to include a downwardly opening upper guide slot (not shown) associated with each of the six head-receiving guide apertures 118 and arranged to lie in alignment with each of the six lower guide slots 120.

Figure 10:
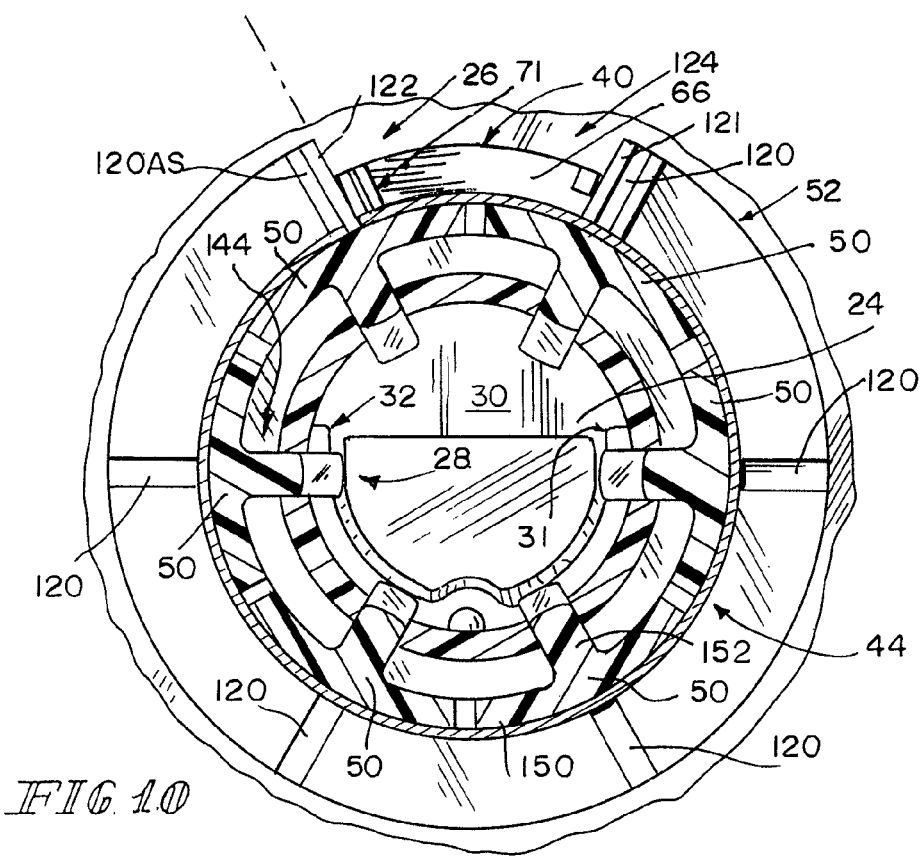
FIG. 10 is a transverse sectional view taken along line 10-10 of FIGS. 5 and 14 showing the variable-circumference band in a normal narrow-diameter mode (contracted state) and showing the lock ring in the flapper door-locking position.

Multi-part door lock opener 28 is shown, for example, in FIG. 4 and, in an illustrative embodiment, comprises six separate arc-shaped band movers 50. Band movers 50 are arranged to lie in an interior region 144 formed inside variable-circumference band 44 as suggested in FIGS. 4, 5, 6, 10, and 11. Normally band 44 is coiled owing to elasticity of the spring material used to make band 44 to assume a narrow-diameter mode (contracted state) as shown in FIGS. 5 and 10 to arrange band movers 50 in a packed relationship forming a circle and causing ends of adjacent band movers 50 to touch.

Figure 11:
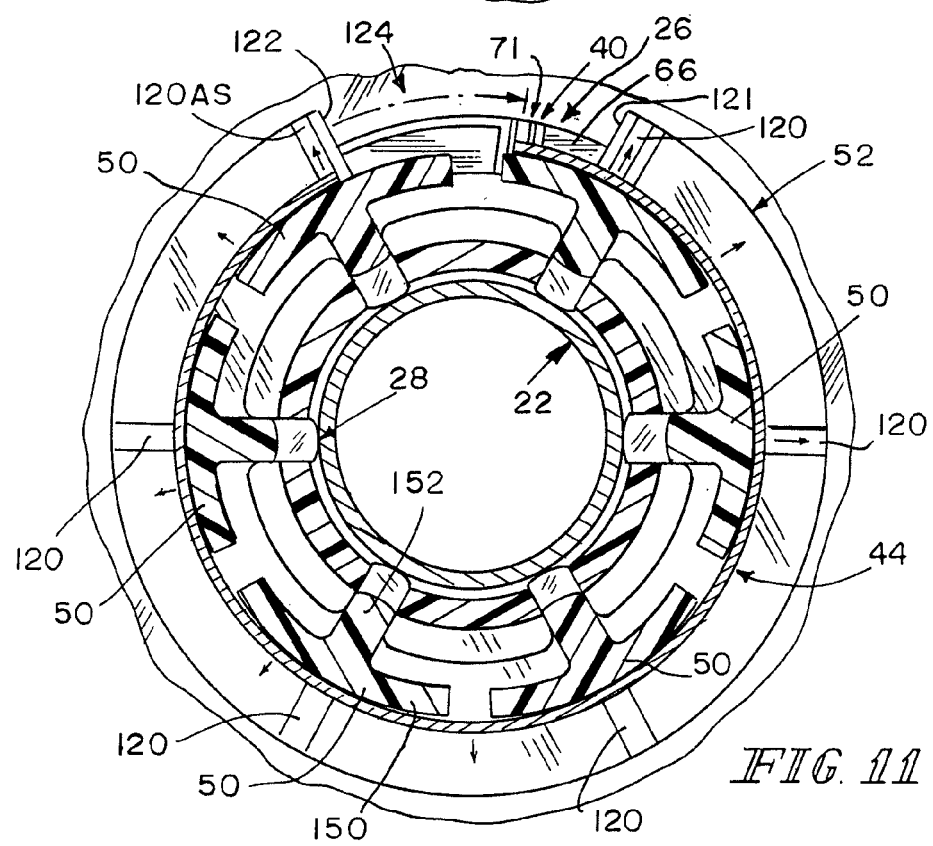
FIG. 11 is a transverse sectional view taken along line 11-11 of FIGS. 6 and 15 showing the variable-circumference band in an expanded large-diameter mode (expanded state) in response to radially outward movement of each of the six arc-shaped band movers caused by axially inward movement of the tip of the large-diameter (diesel) fuel-dispensing nozzle in the nozzle inhibitor toward the pivotable flapper door and showing that the lock ring has rotated in a clockwise direction (see phantom curved arrow) through an angle of about 30° to assume the flapper door-unlocking position.
Figure 12:
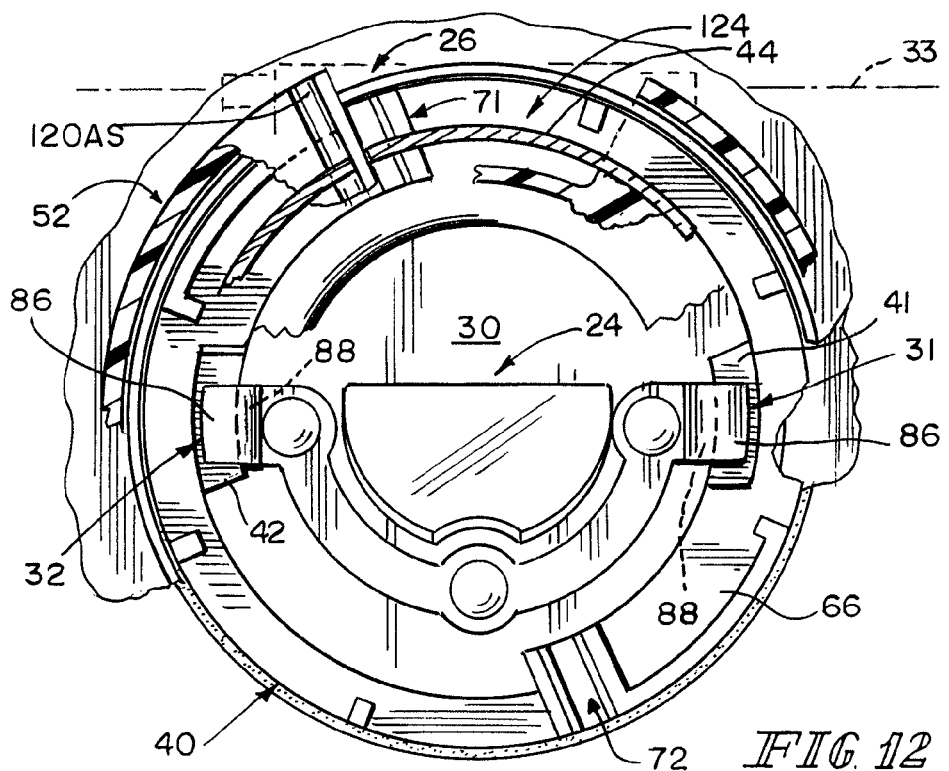
FIG. 12 is a top plan view of the filler neck closure assembly of FIG. 5 taken along lines 12-12 of FIG. 5, with portions broken away, showing the variable-circumference band in the normal narrow-diameter mode and the lock ring in the flapper door-locking position.
Figure 13:
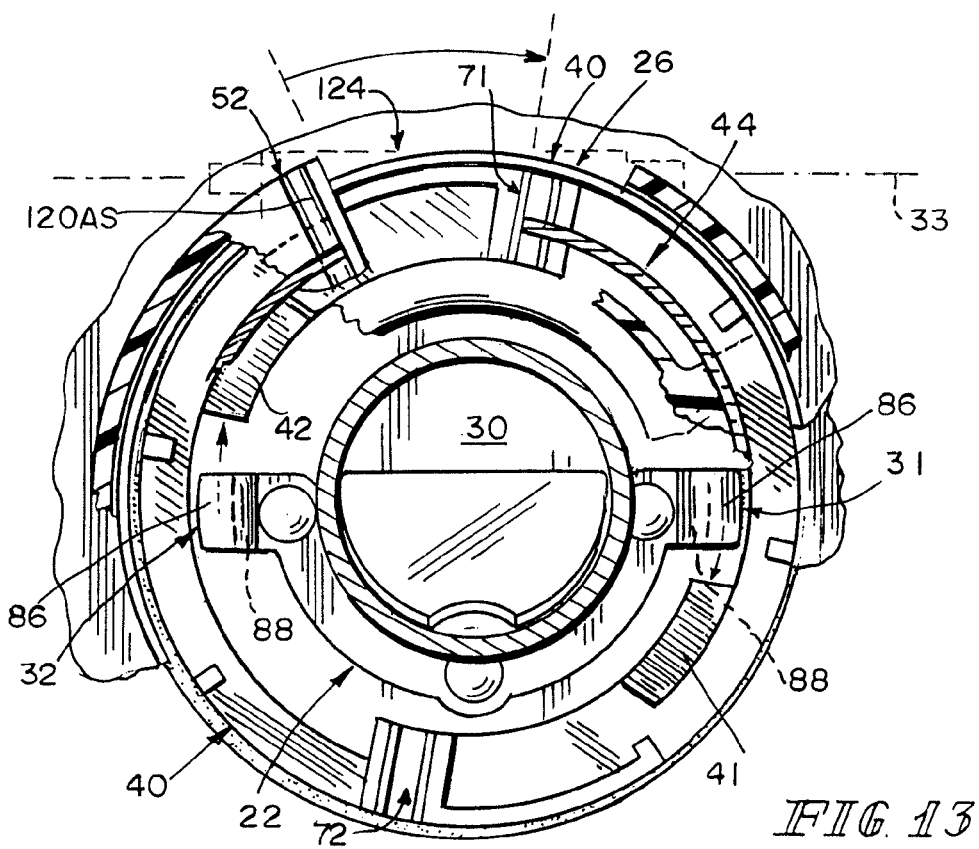
FIG. 13 is a top plan view of the filler neck closure assembly of FIG. 6 taken along lines 13-13 of FIG. 6, with portions broken away, showing the variable-circumference band in the expanded large-diameter mode and the lock ring in the flapper door-unlocking position.

The outer diameter of small-diameter (unleaded) fuel-dispensing nozzle 20 is not large enough to contact all the band movers 50 of multi-part door lock opener 28 (as suggested in FIG. 16) and move them in radially outer directions to expand the circumference (and diameter) of variable-circumference band 44 and cause band 44 to assume the large-diameter mode (contracted state) shown in FIGS. 6, 11, and 13 when small-diameter nozzle 20 is inserted into filler neck closure assembly 11. However, large-diameter (diesel) fuel-dispensing nozzle 22 has a relatively larger diameter and is able to spread arc-shaped band movers 50 away from a central vertical axis 45 extending through flapper door lock 26 when large-diameter nozzle 22 is moved downwardly through a nozzle-receiving passageway formed in guide housing 52 toward flapper door 24 as suggested in FIGS. 6, 11, and 15. The spreading arc-shaped band movers 50 cooperate to expand the circumference (and diameter) of variable-circumference band 44 and move first and second door-motion blockers 41, 42 along curved paths as suggested in FIGS. 7-9 to separate from horizontally extending retention flanges 86 included in companion door-position retainers 31, 32 releasing flapper door 80 to be free to move from a closed position to an opened position.

An illustrative band mover 50 is shown in FIG. 4. Each band mover 50 includes an actuator 147 and a lower guide post 148 coupled to the bottom of actuator 147. Actuator 147 comprises a curved push head 150 and a radially inwardly extending push-head driver 152 coupled to a concave interior wall 154 of curved push head 150. A convex exterior wall 156 of curved push head 150 is formed to include three convex curved rails sized and arranged to engage an interior surface of variable-circumference band 130. Push-head driver 152 includes a sloped ramp 158 and arranged to provide means for engaging a tip of a downwardly moving large-diameter (diesel) fuel-dispensing nozzle 22 during movement of such a nozzle 22 through filler neck closure assembly 11 toward filler neck 12 as suggested in FIGS. 14 and 15. Lower guide post 148 is elongated and oblong and arranged to extend in a radial direction along a bottom portion of curved push head 150 and oblong push-head driver 152 and slide back and forth in a companion lower guide slot 120 formed in guide housing 52. Push-head driver 152 is sized to fit into and slide back and forth in a companion head-receiving guide aperture 118 formed in guide housing 52.

Flapper door return spring 82 of flapper door 24 includes a coiled portion 182 coupled to pivot mount 34 of flapper door 24, a first leg 184 arranged to engage guide housing 52, and a second leg 186 arranged to engage door plate 30 as suggested in FIGS. 4 and 14. Coiled portion 182 is arranged to interconnect first and second legs 184, 186. Return spring 82 is configured to provide means for yieldably moving door plate 30 about pivot axis 33 normally to assume the closed position on guide housing 52 as shown, for example, in FIGS. 14 and 15.

As shown in FIG. 5, a tip of a large-diameter (diesel) fuel-dispensing nozzle 22 can be positioned above nozzle inhibitor 10 by a user. Door plate 30 of flapper door 24 is retained in the closed position by mating engagement of first and second door-motion blockers 41, 42 included in flapper door lock 26 and companion first and second door-position retainers 31, 32 included in flapper door 24. Variable-circumference band 130 of flapper door lock 26 is shown in FIGS. 5 and 10 in a normal narrow-diameter mode surrounding six arc-shaped band movers 50.

Figure 15:
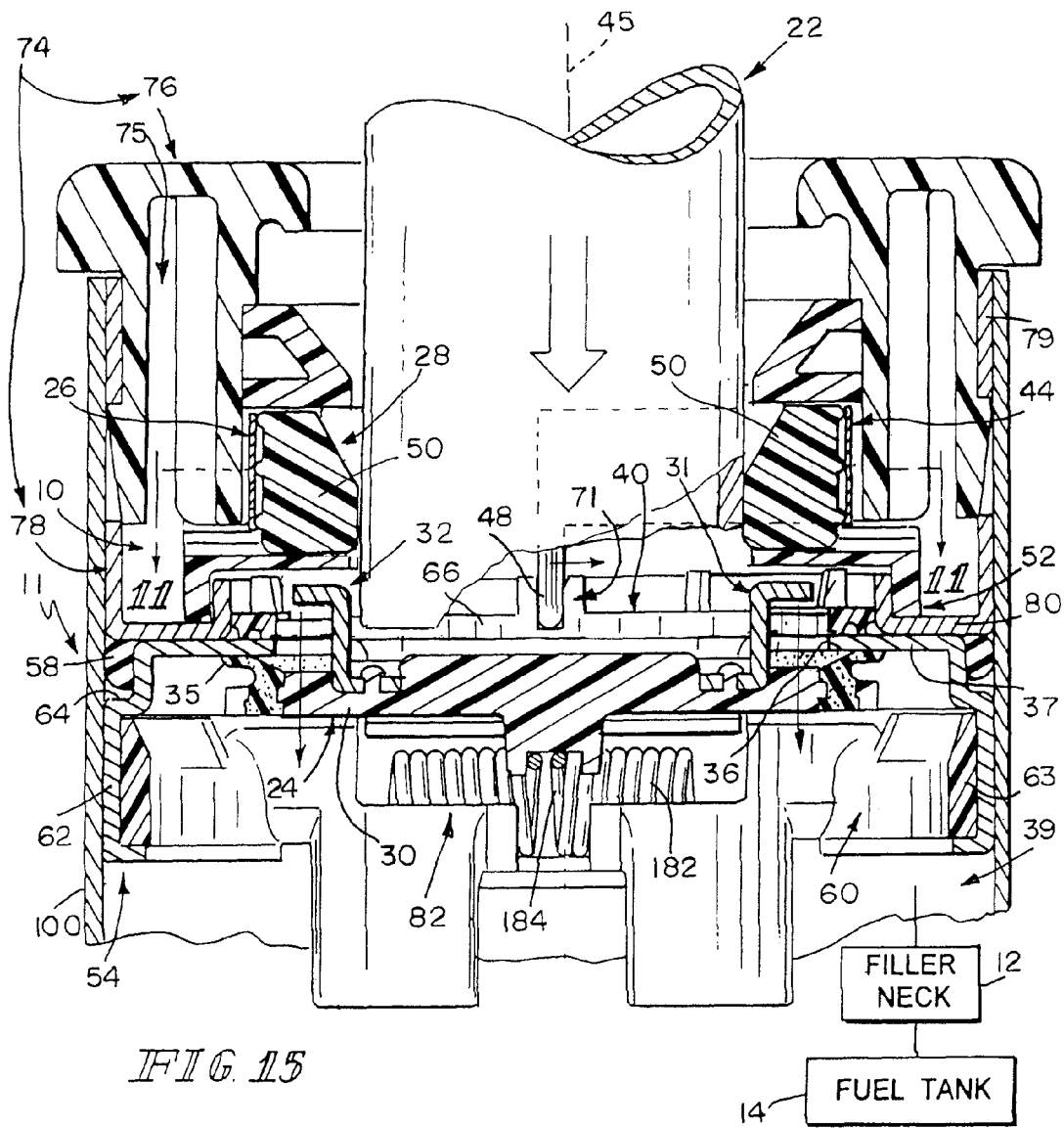
FIG. 15 is a vertical section view of the filler neck closure assembly of FIG. 6, with a portion of the tip of the large-diameter (diesel) fuel-dispensing nozzle removed.

After movement of the tip of large-diameter (diesel) fuel-dispensing nozzle 22 into a central opening 77 formed in inhibitor housing 77 of nozzle inhibitor 10, the tip of nozzle 22 contacts sloped ramps 158 on the (six) arc-shaped band movers 50 and urges push-head drivers 152 of band movers 50 to slide in radially outward directions to assume retracted positions in channels (i.e., head-receiving guide apertures 118) formed in guide housing 52 of nozzle inhibitor 10 as suggested in FIGS. 6 and 11. Resulting expansion of variable-circumference band 44 of flapper door lock 26 to assume an expanded large-diameter mode is shown in FIGS. 6, 11, and 15. Such expansion is effected in response to radially outward movement of each of the six arc-shaped band movers 50 caused by axially inward movement of the tip of the large-diameter (diesel) fuel-dispensing nozzle 22 to reach the pivotable door plate 30 of flapper door 24 included in nozzle inhibitor 10.

Figure 16:
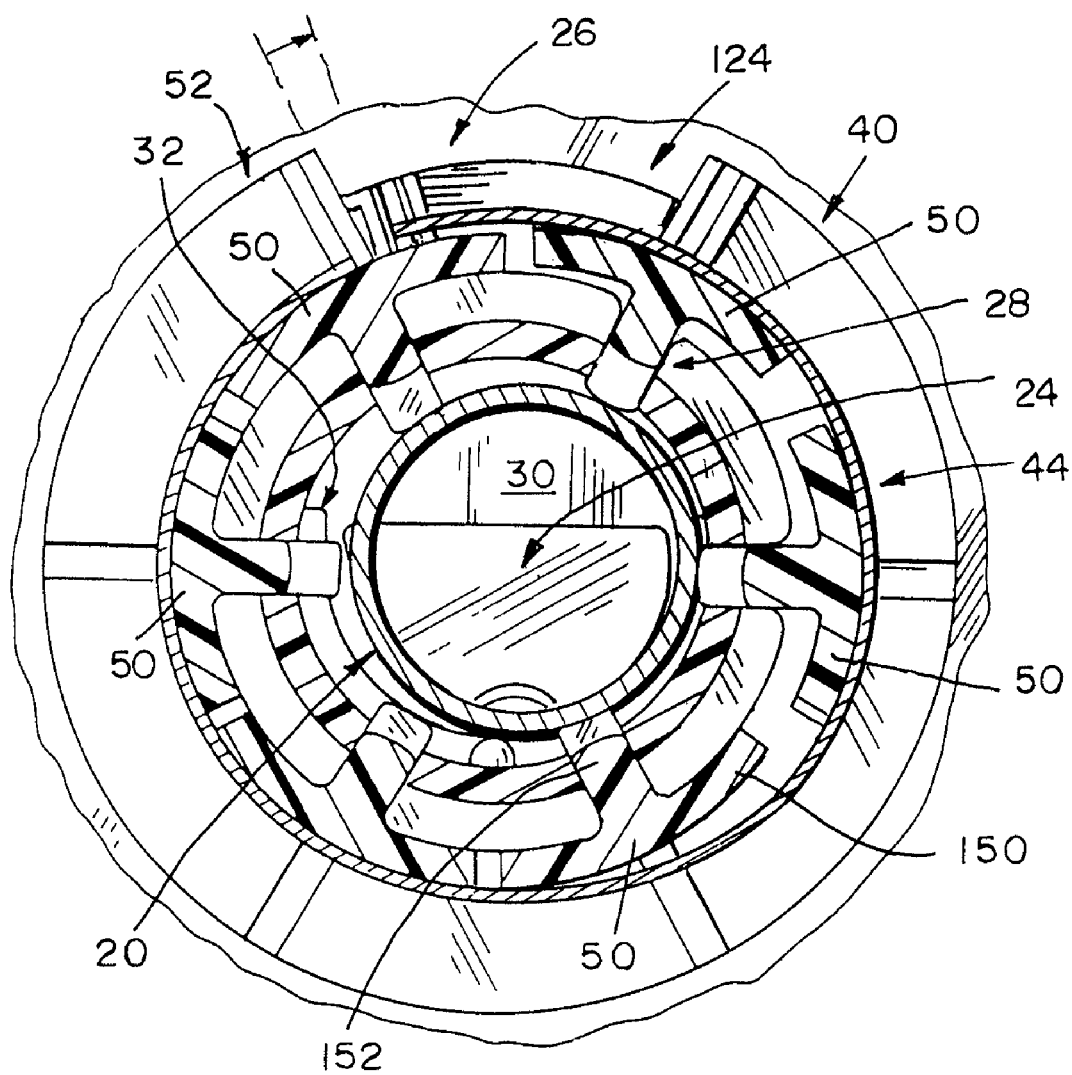
FIG. 16 is a transverse sectional view similar to FIG. 11 showing an unsuccessful attempt to use a small-diameter (unleaded) fuel-dispensing nozzle to move the six arc-shaped band movers outwardly to expand the variable-circumference band to cause the ring rotator to rotate the lock ring from a flapper door-locking position to a flapper door-unlocking position.

Movement of an unauthorized small-diameter (unleaded) fuel-dispensing nozzle 20 into inhibitor housing 74 of nozzle inhibitor 10 to reach and contact flapper door 24 while door plate 30 of flapper door 24 is retained in the closed position by mating engagement (i.e., confronting opposition) of door-motion blockers 41, 42 of flapper door lock 26 and door-position retainers of flapper door 24 is suggested in FIG. 16. Variable-circumference band 44 of flapper door lock 24 is shown in FIG. 15 in the normal narrow-diameter mode surrounding six arc-shaped band movers 142 to cause flapper door 24 to be retained in the closed position.

A tip of a large-diameter (diesel) fuel-dispensing nozzle 22 above the nozzle inhibitor as shown, for example, in FIG. 5. Portions of fill tube 100, outer shell 76, and inner shell 78 have been removed to show variable-circumference band 44 surrounding arc-shaped band movers 50, a relatively shorter band anchor 46 (tab) coupled to one end of band 44 (on the right) and arranged to extend downwardly into a radially extending guide slot 120 (anchor socket) formed in band-motion guide housing 52 and a relatively long ring rotator 48 (tab) coupled to an opposite end of band 44 (on the left) and arranged to extend downwardly into a first rotator socket 71 formed in lock ring 40. One of guide slots 120AS has a dual role in that it serves as a guide slot for a slidable band mover 50 and as an anchor socket for band anchor 46 included in flapper door lock 26.

After downward movement of the tip of large-diameter (diesel) fuel-dispensing nozzle 22 into a central opening 77 formed in nozzle housing 74 of the nozzle inhibitor 10 to contact sloped ramps 158 on six arc-shaped band movers 50, the band movers 50 are urged to slide in radially outward directions in guide slots 120 formed in guide housing 52 to expand the circumference of variable-circumference band 44. Such expansion causes ring rotator 48 to move (to the left) in a direction away from the stationary band anchor 46 so as to rotate lock ring 40 in a clockwise direction (relative to the stationary band-motion guide housing 52 coupled to band anchor 46) to disengage and separate from the flapper door 24 (as suggested in FIGS. 7-9 and 12-13) to free door plate 30 of flapper door 24 to be pivoted to assume an opened position by further downward movement of the tip of large-diameter (diesel) fuel-dispensing nozzle 22.

As suggested in FIG. 7, ring rotator 48 extends downwardly from one end of variable-circumference band 44 into a first rotator socket 71 formed in lock ring 40 while lock ring 40 lies in a flapper door-locking position relative to flapper door 24. A radially inwardly extending first door-motion blocker 41 (shown in phantom) included in lock ring 40 and is arranged to lie under and in confronting relation to a horizontal retention flange 86 included in the L-shaped upstanding first door-position retainer 31 included in the flapper door 24. A radially inwardly extending second door-motion blocker 42 (shown in solid) included in lock ring 40 and is arranged to lie under and in confronting relation to a horizontal retention flange 86 included in the L-shaped upstanding second door-position retainer 32 included in flapper door 24.

Lock ring 40 rotates in clockwise direction 101 about vertical central axis 45 relative to the underlying pivotable flapper door 24 in response to a rotation-inducing torque applied by ring rotator 48 during expansion of the circumference of variable-circumference band 44 is shown in FIG. 8. Such rotation causes first door-motion blocker 41 to begin to move along a curved path away from the companion first door-position retainer 31 and to cause second door-motion blocker 42 to begin to move along a curved path away from second door-position retainer 32.

Further clockwise rotation 101 of lock ring 40 about vertical central axis 45 in response to further expansion of the circumference of variable-circumference band 44 is shown in FIG. 9. Such further clockwise rotation 101 causes first door-motion blocker 41 in the lock ring 40 to separate from first door-position retainer 31 in flapper door 24 and second door-motion blocker 42 in lock ring 40 to separate from second door-position retainer 32 in flapper door 24 so that lock ring 40 is moved to assume the flapper door-unlocking position freeing flapper door 24 to pivot from a closed position (shown in solid in FIGS. 7-9) to an opened position (shown in phantom in FIG. 9).

The invention claimed is:

1. A filler neck closure assembly associated with a vehicle fuel tank filler neck, the assembly comprising
inhibitor means in a fill tube for preventing insertion of a small-diameter unleaded fuel-dispensing nozzle into a fuel-conducting passageway formed in a filler neck interconnecting the fill tube and a vehicle fuel tank while allowing insertion of a large-diameter diesel fuel-dispensing nozzle into the fuel-conducting passageway formed in the filler neck, wherein the inhibitor means includes a fill-tube closure formed to include an aperture opening into the fuel-conducting passageway formed in the filler neck and a flapper door mounted for movement relative to the fill tube to open and close the aperture, a flapper door lock including a lock ring mounted for rotation about an axis between a flapper door-locking position blocking movement of the flapper door relative to the fill tube and a flapper door-unlocking position allowing movement of the flapper door from the closed position to the opened position, and a door lock opener coupled to the flapper door lock and configured to impart rotation to the lock ring to rotate the lock ring from the flapper door-locking position to the flapper door-unlocking position in response to exposure to the large-diameter diesel fuel-dispensing nozzle during movement of the large-diameter diesel fuel-dispensing nozzle in the fill tube toward the aperture formed in the fill-tube closure.

2. The assembly of claim 1, wherein the lock ring includes a rotatable frame and a door-motion blocker coupled to the rotatable frame to rotate therewith and the flapper door lock includes a door plate mounted in the fuel-conducting passageway in the filler neck for movement between a closed position closing the aperture formed in the fill-tube closure and an opened position opening the aperture formed in the fill-tube closure and a door-position retainer coupled to the door plate to move therewith and arranged to confront and mate with the door-motion blocker included in the lock ring upon movement of the lock ring to the flapper door-locking position to block movement of the door plate from the closed position to the opened position and to separate from the door-motion blocker included in the lock ring upon rotation of the lock ring about the axis to free the door plate to be moved from the closed position to the opened position by a large-diameter diesel fuel-dispensing pump nozzle moving through the fill tube and the aperture in a direction toward the fuel-conducting passageway in the filler neck.

3. The assembly of claim 2, wherein the rotatable frame has an annular shape and the door-motion blocker is a plate cantilevered to an interior edge of the annular frame and arranged to extend radially inwardly from the annular frame toward the axis.

4. The assembly of claim 3, wherein the door-position retainer includes a retention flange arranged to overlie the door-motion blocker and lie in a position between the door-motion blocker and the door lock opener when the lock ring has been moved to assume the flapper door-locking position and the door-position retainer further includes a flange-support leg coupled to the door plate and to the retention flange and arranged to extend through the aperture formed in the fill-tube closure when the door plate has been moved to assume the closed position.

5. The assembly of claim 3, wherein the fill-tube closure further includes a base including a wall formed to include the aperture and mounted in the fill tube to overlie the door plate of the flapper door and to underlie the rotatable frame.

6. The assembly of claim 5, wherein the rotatable frame is supported on the wall of the base for rotation about the axis.

7. The assembly of claim 5, wherein the flapper door further includes a pivot mount coupled to the base and to the door plate and configured to support the door plate for pivotable movement about a pivot axis relative to the wall of the base between the closed position and the opened position.

8. The assembly of claim 2, wherein the flapper door lock further includes a variable-circumference band that is expandable to change from a normal narrow-diameter mode characterized by a first diameter and circumference to a large-diameter mode characterized by a relatively larger second diameter and circumference and a movable ring rotator coupled to the variable-circumference band and to the lock ring and arranged to import rotation to the lock ring to cause the lock ring to rotate about the axis from the flapper door-locking position to the flapper door-unlocking position in response to expansion of the variable-circumference band to assume the large-diameter mode.

9. The assembly of claim 8, wherein the door lock opener includes several band movers located in an interior region formed in the variable-circumference band and arranged to lie along an interior surface of the variable-circumference band and the band movers cooperate to move relative to the variable-circumference band and to one another to expand the diameter and the circumference of the variable-circumference band to assume the large-diameter mode to move the ring rotator relative to the fill tube to rotate the lock ring from the flapper door-locking position to the flapper door-unlocking position to separate the door-motion blocker from the door-position retainer to free the door plate to be moved from the closed position to the opened position in response to movement of the large-diameter fuel-dispensing nozzle in the fill tube toward the aperture formed in the fill-tube closure.

10. The assembly of claim 9, wherein the door lock opener further includes a band-mover guide housing in the fill tube, the band movers are mounted for movement on the band-mover guide housing, and the flapper door lock further includes a stationary band anchor coupled to the variable-circumference band and to the band-mover guide housing.

11. The assembly of claim 10, wherein the variable-circumference band is a curved strip configured normally to assume the narrow-diameter mode owing to elasticity of spring material formed to make the variable-circumference band and formed to have spaced-apart first and second ends, the stationary band anchor is coupled to the first end of the curved strip, and the ring rotator is coupled to the second end of the curved strip.

12. A filler neck closure assembly associated with a vehicle fuel tank filler neck and configured to include a nozzle inhibitor comprising
a band-mover guide housing,
a plurality of band movers disposed on the guide housing such that the plurality of band movers move radially between first and second positions,
a resilient variable-circumference band surrounding the band movers, the resilient variable-circumference band having a contracted state wherein the band movers are in the first position and an expanded state where the movers are in the second position,
a locking ring comprising a motion blocker,
a ring rotator coupled to the locking ring and to the resilient variable-circumference band such that expansion of the resilient variable-circumference band from the contracted state to the expanded state rotates the locking ring through a predetermined angular displacement from a locked state to an unlocked state,
a flapper door pivotably disposed adjacent to the locking ring, the flapper door having a top surface and a bottom surface, and
a door-position retainer disposed on the top surface of the flapper door, the door-positioner retainer being in registry with the motion blocker included in the locking ring when the locking ring is in a locked state and being out of registry with the motion blocker when the locking ring is in the unlocked state, wherein the flapper door is pivotable from a closed position to an opened position when the locking ring is in the unlocked state.

13. The nozzle inhibitor of claim 12, further comprising an inhibitor housing disposed adjacent to the guide housing, the inhibitor housing defining an inlet into which a fuel-dispensing nozzle is inserted.

14. The nozzle inhibitor of claim 12, further comprising a base disposed between the locking ring and the flapper door, the base providing a surface engaged by the flapper door when the flapper door is in the closed position and being formed to include a nozzle-receiving aperture closed by the flapper door in the closed position and opened when the flapper door is in the opened position.

15. The nozzle inhibitor of claim 12, wherein the guide housing defines a central portion and a flange extending radially outward from the central portion, the ring rotator engages a rotator socket formed in the locking ring, a band anchor engages an anchor socket formed on the flange, and expansion of the resilient variable-circumference band causes the ring rotator to move relative to the band anchor, thus causing the locking ring to rotate between the locked state and the unlocked state.

16. A filler neck closure assembly associated with a vehicle fuel tank filler neck and configured to include a nozzle inhibitor comprising
a guide housing into which a nozzle may be inserted,
a resilient variable-circumference band disposed adjacent to the guide housing,
means for moving the resilient variable-circumference band between a contracted state and an expanded state and located between the resilient variable-circumference band and the guide housing,
means for stopping movement of the nozzle, the stopping means being disposed adjacent to the resilient band, and
locking means comprising a plurality of retainers and a plurality of motion blockers that engage one another when the locking means is in a locked state and fail to engage one another when the locking means is in an unlocked state, wherein the locking means is coupled to the resilient variable-circumference band such that expansion of the resilient variable-circumference band from the contracted state to the expanded state by the moving means causes the locking means to transition from a locked state to an unlocked state and wherein the stopping means stops the nozzle when the locking means is in the locked state and fails to stop the nozzle when the locking means is in the unlocked state.

17. The nozzle inhibitor of claim 16, wherein the motion blockers are disposed on a locking ring.

18. The nozzle inhibitor of claim 17, wherein the motion blockers are defined by the locking ring and are moved circumferentially with respect to the guide housing by the moving means via the resilient variable-circumference band.

19. The nozzle inhibitor of claim 16, wherein the moving means comprises a plurality of independently actuated band movers disposed around the guide housing.

20. The nozzle inhibitor of claim 19, wherein the band movers each comprise a curved portion and a radial portion connected to the curved portion, the radial portion defines an inclined surface, and the radial portion extends into the guide housing.

21. The nozzle inhibitor of claim 16, wherein the means for stopping movement of the nozzle comprises a door-receiving structure disposed adjacent to the guide housing, a flapper door pivotably disposed in the door-receiving structure, and a flapper door return spring configured to bias the flapper door in a closed position.

* * * * *